United States Patent
Fukuzawa

(10) Patent No.: US 7,672,217 B2
(45) Date of Patent: *Mar. 2, 2010

(54) OPTICAL RECORDING MEDIUM AND OPTICAL RECORDING/REPRODUCING METHOD

(75) Inventor: Narutoshi Fukuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1635 days.

This patent is subject to a terminal disclaimer.

(21) Appl. No.: 10/657,244

(22) Filed: Sep. 9, 2003

(65) Prior Publication Data

US 2004/0047282 A1    Mar. 11, 2004

(30) Foreign Application Priority Data

Sep. 11, 2002  (JP) .............................. 2002-264972

(51) Int. Cl.
*G11B 3/70* (2006.01)
(52) U.S. Cl. ........................ 369/288; 548/100; 548/181
(58) Field of Classification Search ........................ None
See application file for complete search history.

(56) References Cited

U.S. PATENT DOCUMENTS

| | | | | | |
|---|---|---|---|---|---|
| 5,326,679 | A | * | 7/1994 | Yanagisawa et al. | ... 430/270.19 |
| 6,071,672 | A | * | 6/2000 | Namba et al. | .......... 430/270.18 |
| 6,683,188 | B1 | * | 1/2004 | Kasada et al. | ................ 548/181 |
| 7,094,516 | B2 | * | 8/2006 | Ogiso et al. | ............. 430/270.14 |
| 2002/0034605 | A1 | * | 3/2002 | Matsui et al. | ............... 428/64.4 |
| 2003/0064322 | A1 | * | 4/2003 | Koyama et al. | ......... 430/270.11 |

FOREIGN PATENT DOCUMENTS

| | | | |
|---|---|---|---|
| EP | 1103962 A2 | * | 5/2001 |
| EP | 1178083 A1 | * | 2/2002 |
| JP | 04-074690 | | 3/1992 |
| JP | 5/38879 | | 2/1993 |
| JP | 6-40161 | | 2/1994 |
| JP | 6-295469 | | 10/1994 |
| JP | 2001-71639 | | 3/2001 |
| JP | 2001-273672 | | 10/2001 |
| WO | WO 0144374 | * | 5/2001 |

\* cited by examiner

*Primary Examiner*—Joseph H Feild
*Assistant Examiner*—Tawfik Goma
(74) *Attorney, Agent, or Firm*—Oblon, Spivak, McClelland, Maier & Neustadt, L.L.P.

(57) ABSTRACT

The present invention provides an optical recording medium that includes a recording layer composed mainly of an organic compound and can utilize blue-violet semiconductor laser light (390 to 420 nm in wavelength) as recording/reproducing laser light. The present invention also provides an optical recording/reproducing method using the optical recording medium. The optical recording medium 1 comprises at least a supporting substrate 2; a recording layer 3 on the supporting substrate 2, the recording layer 3 containing an organic compound as a major component; and a light-transmitting layer 5 on the recording layer 3, the light-transmitting layer 5 being capable of transmitting laser light with a wavelength of 390 to 420 nm for recording and reproducing information. The organic compound in the recording layer 3 includes a monomethine cyanine dye that has the minimum value $n_{min}$ of its refractive index n (real part of the complex refractive index) within the range of 370 to 425 nm and has a refractive index n of 1.2 or lower with respect to the wavelength of the recording/reproducing laser light. The organic compound, when absorbing the laser light, melts or degrades to bring about a change in the refractive index, thereby effecting recording of the information.

11 Claims, 1 Drawing Sheet

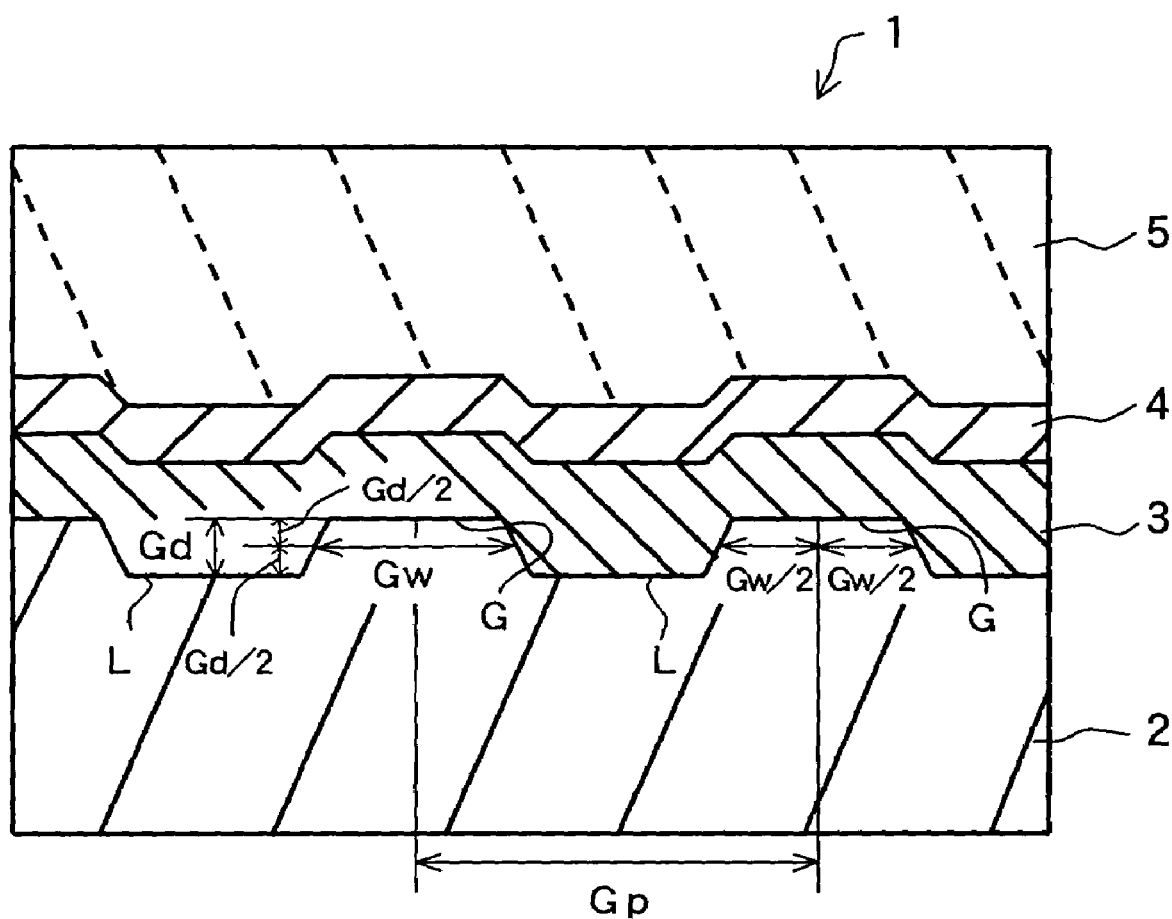

OPTICAL RECORDING MEDIUM AND OPTICAL RECORDING/REPRODUCING METHOD

BACKGROUND OF THE INVENTION

1. Field of the Invention

The present invention relates to an optical recording medium that includes a recording layer composed mainly of an organic compound, and to an optical recording/reproducing method using the optical recording medium.

2. Disclosure of the Related Art

Rewritable media for optical recording of information, such as CD-Rs (compact disk-recordable) and DVD-Rs (digital versatile disk-recordable), have become widely used. Such recording media include a recording layer that makes use of an organic dye. CD-R, a recording medium that permits the use of near infrared laser light in recording/reproduction of information, offers advantageous characteristics, such as low prices and ability to keep recorded information from being altered, that have made this recording medium widely accepted in the marketplace. In response to an increasing demand for high-density recording medium that offers long recording time, DVD-Rs have been developed and become increasingly popular. DVD-Rs enable long-time recording by permitting the use of infrared laser light in recording/reproducing of information: DVD-Rs can utilize recording/reproducing laser light with a wavelength of 650 nm, as compared to 780 nm used in CDs, and optical systems employed in DVD-Rs achieve a numerical aperture (referred to as 'NA,' hereinafter) of 0.6, as compared to 0.45 for CDs. In this manner, DVD-Rs have achieved a large recording capacity (4.7 GB/per side), which is 6 to 8 times larger than that of CDs and allows about 2-hour recording time when typical TV signals are recorded.

To meet a demand for recording media with even higher recording density, efforts have been made to further decrease the wavelength of the recording/reproducing laser light and increase the numerical aperture of the optical system employed. For example, an advanced optical recording medium is proposed for use in a system in which blue-violet semiconductor laser light (390 to 420 nm in wavelength) is used as the recording/reproducing laser light in conjunction with a lens system with an NA of 0.76 or higher. The use of the short wavelength laser light is expected to bring about a significant increase in the recording density of optical recording media.

Various organic dye materials have been proposed for use in the recording layers of CD-Rs and DVD-Rs. Some of these materials that have already been put to practical use are such that the long wavelength region of their absorption spectrum corresponds to the wavelength of the recording/reproducing laser light and the requirements for both the high refractive index (n>2.0) and the proper extinction coefficient (0.01<k<0.10) are met in the long wavelength region. When the recording laser light is irradiated onto the recording layer, the organic dye material absorbs the light and as a result, melts or degrades, which in turn causes the refractive index of the recording layer to decrease from a relatively high value to a relatively low value. As a result, recording pits are formed to record information. To subsequently reproduce the recorded information, the reproducing laser is shone onto the recording layer and the information is read by taking advantage of the difference in the reflective index with respect to the laser light between the recording pit and the surrounding non-recording area.

CD-Rs and DVD-Rs are both required to have a high reflective index in order to ensure compatibility with CD-ROMs (read-only memory) and DVD-ROMs, both of which have a high reflective index. However, the organic dye material that has a refractive index of 2<n<3 and an extinction coefficient of 0.01<k<0.10 cannot provide a desired high reflective index by itself. For this reason, CD-Rs and DVD-Rs include a highly reflective metal reflection layer on one side of the recording layer opposite from the side exposed to the laser light. In short, for the purpose of ensuring a high reflective index and a high modulation and thus ensuring the compatibility with ROMs, CD-Rs and DVD-Rs both employ an organic dye material that, when illuminated with light in the wavelength range of the recording/reproducing laser, melts or degrades to change its refractive index from a relatively high value to a relatively low value.

The advanced optical recording media, in which blue-violet semiconductor laser light (390 to 420 nm in wavelength) is use as the recording/reproducing laser light, generally have a low reflective index, since there is difficulty in principle in imparting a high reflectance comparable to that of ROMs to the rewritable media (RW), which use a phase-change material in their recording layers. Thus, if a rewritable optical recording medium is developed that, unlike CD-Rs and DVD-Rs, does not require a high reflective index, it will become possible to use, in the recording layer of the recording medium, an organic dye material that, when irradiated with laser light, melts or degrades to cause the refractive index to change from a relatively low value to a relatively high value. This possibility is suggested in Japanese Patent Laid-Open Publication No. 2001-273672.

SUMMARY OF THE INVENTION

However, no organic dye materials have been known thus far that melts or degrades to cause the refractive index to change from a relatively low value to a relatively high value by the wavelength range of the recording/reproducing laser of 390 to 420 nm. Also, unlike the case with CD-Rs and DVD-Rs, it is generally considered difficult to adapt the longer wavelength region of the absorbance spectrum to the range of 390 to 420 nm. While some UV-absorbing agents are known to have the longer wavelength region of their absorbance spectrum within the range of 390 to 420 nm, the relatively short conjugate system of, and thus the relatively small molecular size of, the UV-absorbing agents make them less soluble in an organic solvent. Not only does this make UV-absorbing agents unsuitable for use in spin-coating, but it also makes them susceptible to crystallization when the agents are formed into a thin film.

Accordingly, it is an objective of the present invention to provide an optical recording medium that includes a recording layer composed mainly of an organic compound and can utilize blue-violet semiconductor laser light (390 to 420 nm in wavelength) as the recording/reproducing laser light. It is also an objective of the present invention to provide an optical recording/reproducing method using the optical recording medium.

Thus, one aspect of the present invention provides an optical recording medium comprising at least a supporting substrate; a recording layer on the supporting substrate, the recording layer containing an organic compound as a major component; and a light-transmitting layer on the recording layer, the light-transmitting layer being capable of transmitting laser light with a wavelength of 390 to 420 nm for recording and reproducing information, wherein the organic compound in the recording layer includes a monomethine cyanine dye that has the minimum value $n_{min}$ of its refractive index n (real part of the complex refractive index) within the range of 370 to 425 nm and has a refractive index n of 1.2 or lower with respect to the wavelength of the recording/reproducing laser light, and the organic compound, when absorbing the laser light, melts or degrades to bring about a change in the refractive index, thereby effecting recording of the information.

The present invention is the above-described optical recording medium, wherein, at the wavelength of the reproducing laser light, the melting or the degradation of the organic compound causes an increase in the refractive index n of the organic compound.

The present invention is the above-described optical recording medium, wherein the organic compound has an extinction coefficient k (imaginary part of the complex refractive index) of 0.15 or above, with respect to both the wavelength of the recording laser light and the wavelength of the reproducing laser light.

The present invention is the above-described optical recording medium, wherein the monomethine cyanine dye contains a monomethine group with two nitrogen-containing heterocyclic rings positioned on ends of the monomethine group, one of the two nitrogen-containing heterocyclic rings being selected from the group consisting of indolenine and benzothiazole, and the other of the two heterocyclic rings being selected from the group consisting of indolenine, quinoline, benzothiazole, benzimidazole and benzoselenazole.

The present invention is the above-described optical recording medium, wherein the monomethine cyanine dye contains a monomethine group with two nitrogen-containing heterocyclic rings positioned on ends of the monomethine group, the two nitrogen-containing heterocyclic rings being identical to one another.

The present invention is the above-described optical recording medium, wherein the recording layer contains, in addition to the organic compound, a quencher.

The present invention is the above-described optical recording medium, in which lands and grooves are formed on the supporting substrate with the grooves being 60 to 150 nm in depth. In another embodiment, the present invention is the above-described optical recording medium, in which only the land area serves as the recording area.

The present invention is the above-described optical recording medium, which comprises a dielectric layer on the recording layer and the light-transmitting layer on the dielectric layer. In another embodiment, the present invention is the above-described optical recording medium, in which the dielectric layer has a refractive index $n_4$ (real part of the complex refractive index) of 2 or higher and an extinction coefficient $k_4$ (imaginary part of the complex refractive index) of 0.2 or lower with respect to the wavelength of the recording/reproducing laser light.

The present invention is the above-described optical recording medium, in which the light-transmitting layer has a thickness of 1 μm to 150 μm in the signal recording/reproducing region.

Another aspect of the present invention is an optical recording/reproducing method, comprising the steps of:

providing an optical recording medium comprising at least a supporting substrate; a recording layer on the supporting substrate, the recording layer containing an organic compound as a major component; and a light-transmitting layer on the recording layer, the light-transmitting layer being capable of transmitting laser light with a wavelength of 390 to 420 nm for recording and reproducing information, wherein the organic compound in the recording layer includes a monomethine cyanine dye that has the minimum value $n_{min}$ of its refractive index n (real part of the complex refractive index) within the range of 370 to 425 nm and has a refractive index n of 1.2 or lower with respect to the wavelength of the recording/reproducing laser light, and the organic compound, when absorbing the laser light, melts or degrades to bring about a change in the refractive index;

irradiating a recording laser light of 390 to 420 nm onto the optical recording medium from the light-transmitting layer side thereof to effect recording of the information, whereupon the refractive index n of the organic compound with respect to the wavelength of reproducing laser light of 390 to 420 nm is raised in the area irradiated with the recording laser light; and subsequent to the recording step, irradiating the reproducing laser light of 390 to 420 nm onto the optical recording medium from the light-transmitting layer side thereof to effect reproducing of the information.

According to the present invention, there is provided an optical recording medium including an organic recording layer that allows recording/reproducing of information with a high sensitivity and a high degree of modulation by using blue-violet semiconductor laser light (390 to 420 nm in wavelength) as the recording/reproducing laser light.

BRIEF DESCRIPTION OF THE DRAWING

FIGURE is a schematic cross-section view showing main elements of one exemplary construction of an optical disk of the present invention.

DETAILED DESCRIPTION OF THE INVENTION

An optical recording medium (referred to simply as 'optical disk,' hereinafter) of the present invention will now be described with reference to the accompanying drawing.

Referring to the FIGURE, one exemplary construction of the optical disk of the present invention is shown in a schematic cross-section. In the FIGURE, the optical disk (1) includes a recording layer (3), a dielectric layer (4) and a light-transmitting layer (5) in this order on a surface of a supporting substrate (2) where information pits, pregrooves and other fine features are formed. The laser light upon the optical disk (1) passes through the light-transmitting layer (5) to record or reproduce the information.

The supporting substrate (2) is 0.3 to 1.6 mm thick and preferably, 0.5 to 1.3 mm thick, and includes information pits, pregrooves, lands, and other fine features formed on the same surface where the recording layer (3) is formed. In the present invention, the grooves (G) functioned as guide slots are positioned closer to the side where laser light is irradiated (light-transmitting layer (5) side), and the grooves (G) are formed between the lands (L). The grooves (G) are generally formed as spirals.

The depth (Gd) of the groove (G) is defined as the difference in height between the highest point of the land (L) and the lowest point of the groove (G) and is preferably in the range of 40 to 150 nm, and more preferably in the range of 60 to 120 nm. By setting the depth (Gd) of the groove (G) within this range, sufficient tracking control is achieved and crosstalk can be prevented. If formed with a depth (Gd) of less than 40 nm, the grooves (G) are inclined to result in a decrease in tracking error signals, which are required for following the tracks, an increase in crosstalks, and a decrease in wobble signals and other preformatted signals. On the other hand, the grooves (G) with a depth (Gd) greater than 150 nm make it difficult to accurately form the lands (L) and the grooves (G) and may result in reduced reflection signals and reduced sensitivity.

The width (Gw) of the groove (G) is defined as a width of the groove measured at half the groove depth (Gd) and is preferably in the range of 110 to 210 nm, and more preferably in the range of 130 to 190 nm. The pitch (Gp) of the grooves (G) is defined as a distance between adjacent grooves and may be defined as a distance between midpoints of the adjacent grooves taken along the width (Gw). The groove pitch (Gp) is for example in the range of 290 to 350 nm, and preferably in the range of 310 to 330 nm. Such construction is effective in preventing crosstalks.

While the land-and-groove recording method or the groove recording method may be employed in recording information on the optical recording medium of the present invention, the land recording method, by which only the lands are used as recording areas, is preferred. When the supporting substrate (2) has the above-described construction and the recording layer (3) composed mainly of the organic compound is formed over the supporting substrate (2) using spin-coat technique, the recording layer (3) tends to be formed with a larger thickness in the land areas than in the groove areas with more organic compound formed in the land areas. For this reason, it is preferred to use the lands as only recording areas.

Materials for the supporting substrate (2) should not necessarily be optically transparent and may include various plastic materials such as polycarbonate resin and polymethyl methacrylate (PMMA) and other acryl resins, and polyolefin resin. The use of such flexible materials is particularly effective in the present invention since the substrate can be kept from warping. This, however, does not exclude the use of glass, ceramics, and metals. The features are mostly formed by injection molding when a plastic material is used and by photopolymer technique (2P technique) when other materials are used.

The recording layer (3), which contains the organic compound as a major component, is formed over the supporting substrate (2). The organic compound has the minimum value $n_{min}$ of its refractive index n (real part of the complex refractive index) within the range of 370 to 425 nm and includes a monomethine cyanine dye that has a refractive index n of 1.2 or lower with respect to the wavelength of the recording/reproducing laser light. The monomethine cyanine dye, when absorbing the recording laser light with a wavelength of 390 to 420 nm, melts or degrades to cause a change in the refractive index. By saying "the recording layer contains the organic component as a major component," it is meant that, aside from essential components, the recording layer is composed of the organic compound. The recording layer may, however, contain organic compounds other than the organic compound that has the characteristics mentioned above (for example, a quencher) and may also contain certain inorganic compounds in an amount of 10% or less by weight for the purpose of improving properties of the layer.

The refractive index n (real part of the complex refractive index) for the recording laser light of 390 to 420 nm is selected to be 1.2 or below, so that, upon recording, the organic compound, absorbing the recording laser light of 390 to 420 nm, melts or degrades to cause the refractive index to change from a relatively low value to a relatively high value (for example, 1.45 to 1.65). In this manner, recording pits are formed to record information. Upon reproduction of information, the information is read by taking advantage of the difference in the reflective index for the reproducing laser light of 390 to 420 nm between the recording pit and the surrounding non-recording region. On the basis of this principle, recording with the recording laser light of 390 to 420 nm and reproduction with the reproducing laser light of 390 to 420 nm can be effected. To cause a more significant change in the refractive index, the minimum value $n_{min}$ of the refractive index n within the range of 370 to 425 nm is preferably selected to be 1.1 or lower, and more preferably 1.0 or lower. Although there is no particular lower limit for the minimum value $n_{min}$, it is typically selected to be approximately 0.7.

The extinction coefficient k (imaginary part of the complex refractive index) of the subject organic compound is preferably 0.15 or larger, and more preferably 0.3 or larger, for the wavelength range of both of the recording laser light and the reproducing laser light. The extinction coefficient k for the wavelength of the recording laser light of 0.15 or larger allows the recording laser light to be properly absorbed by the area on which the recording pits are formed. This causes the local temperature to rise and facilitates melting or degradation of the organic compound, which in turn causes the refractive index to change. In contrast, the extinction coefficient k for the wavelength of the recording laser light of less than 0.15 will result in a reduced absorption of the recording laser light, making it difficult to effect recording with normal recording power. On the other hand, the extinction coefficient k for the wavelength of the reproducing laser light of 0.15 or larger provides a desired reflective index in the non-recording areas. This helps to detect the difference in the reflective index between the recording pits and the non-recording area. However, the extinction coefficient k for the wavelength of the reproducing laser light is preferably kept at 0.95 or smaller since too large an extinction coefficient k may cause a reduced reflective index. For these reasons, the extinction coefficient k of the subject organic compound is preferably in the range of 0.3 to 0.95, and more preferably in the range of 0.4 to 0.8, with respect to the wavelength of both of the recording laser light and the reproducing laser light.

In the present invention, the refractive index n (real part of the complex refractive index) and the extinction coefficient k (imaginary part of the complex refractory index) of the organic compound are measured based on the absorption spectrum of the organic compound in the form of thin film. In general, the absorption spectrum of a thin film is obtained in the following manner: an organic compound for which to determine the absorption spectrum is dissolved in a suitable organic solvent. Using spin-coat technique, the resulting solution is applied onto a groove- or pit-free polycarbonate plate to a film thickness of about 40 to 100 nm. Care must be taken to keep the organic compound from having a particular orientation. Should the organic compound undergo significant crystallization or association during evaporation of the solvent in the spin-coat process, a different solvent may be used. Using a spectrophotometer, the resulting polycarbonate substrate with a thin film of the organic compound was measured for the transmission and absorbance spectra.

In the present invention, a monomethine cyanine dye that meets the requirements for the above-described conditions is used to serve as the above-described organic compound. Provided that the above-described conditions are met, the monomethine cyanine dye is selected from those expressed by the following general formula (I):

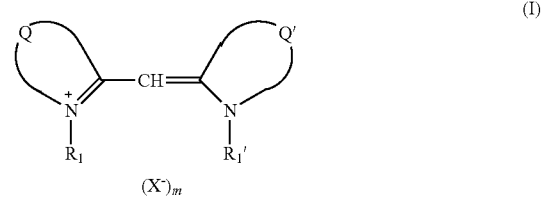

wherein Q and Q' may or may not be identical to one another and each independently represent an atom group forming a nitrogen-containing heterocyclic rings, which may be a condensed ring and may be substituted or unsubstituted; $R_1$ and $R_1'$ may or may not be identical to one another and each independently represent a substituted or unsubstituted alkyl group having 1 to 6, preferably 1 to 4, carbon atoms (i.e., methyl, ethyl, propyl, and butyl); $X^-$ represents an anion, which may be a halogen ion such as Cl⁻, Br⁻, and I⁻, ClO₄⁻, BF₄⁻, PF₆⁻, SbF₆⁻, or SCN⁻; and m is 0 or 1.

In the general formula (I), the nitrogen-containing heterocyclic ring on either end of the monomethine group may be indolenine (A), quinoline (B), benzothiazole (C), benzimidazole (D), or benzoselenazole (E), as represented by the following general formulae (in each formula, N is conveniently shown in the charged state):

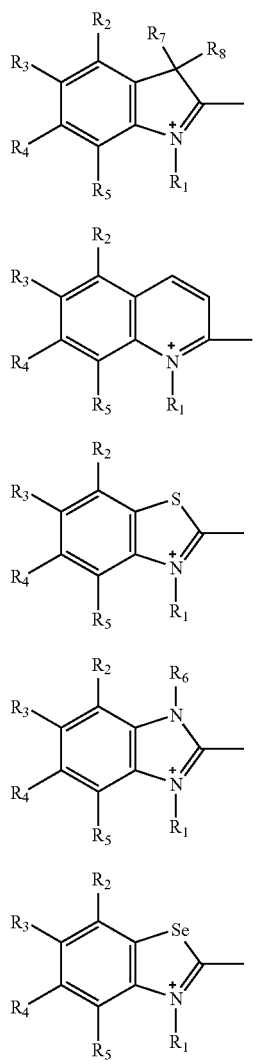

In the general formula (A) representing an indolenine, $R_1$ is a substituted (with, for example, an alkoxy group) or unsubstituted alkyl group preferably having 1 to 4 carbon atoms (i.e., methyl, ethyl, propyl, and butyl). $R_7$ and $R_8$ may or may not be identical to one another and each independently represent a methyl or ethyl group. $R_2$, $R_3$, $R_4$ and $R_5$ may or may not be identical to one another and each independently represent a hydrogen atom, alkyl group, alkoxy group, or a halogen atom such as Cl.

In the general formula (B) representing a quinoline, $R_1$ is a substituted (with, for example, an alkoxy group) or unsubstituted alkyl group having 1 to 4 carbon atoms (i.e., methyl, ethyl, propyl, and butyl, with propyl and butyl particularly preferred). $R_2$, $R_3$, $R_4$ and $R_5$ may or may not be identical to one another and each independently represent a hydrogen atom, alkyl group, or a halogen atom such as Cl.

In the general formula (C) representing an benzothiazole, $R_1$ is a substituted (with, for example, an alkoxy group) or unsubstituted alkyl group having 1 to 4 carbon atoms (i.e., methyl, ethyl, propyl, and butyl, with propyl and butyl particularly preferred). $R_2$, $R_3$, $R_4$ and $R_5$ may or may not be identical to one another and each independently represent a hydrogen atom, alkyl group, or a halogen atom such as Cl.

In the general formula (D) representing a benzimidazole, $R_1$ is a substituted (with, for example, an alkoxy group) or unsubstituted alkyl group having 1 to 4 carbon atoms (i.e., methyl, ethyl, propyl, and butyl, with propyl and butyl particularly preferred). $R_6$ represents a methyl or ethyl group. $R_2$, $R_3$, $R_4$ and $R_5$ may or may not be identical to one another and each independently represent a hydrogen atom, alkyl group, or a halogen atom such as Cl.

In the general formula (E) representing a benzoselenazole, $R_1$ is a substituted (with, for example, an alkoxy group) or unsubstituted alkyl group having 1 to 4 carbon atoms (i.e., methyl, ethyl, propyl, and butyl, with propyl and butyl particularly preferred). $R_2$, $R_3$, $R_4$ and $R_5$ may or may not be identical to one another and each independently represent a hydrogen atom, alkyl group, or a halogen atom such as Cl.

In the general formula (I), one of the two nitrogen-containing heterocyclic rings positioned on ends of the monomethine group is selected from the group consisting of the indolenine (A) and the benzothiazole (C), and the other of the two heterocyclic rings is selected from the group consisting of the indolenine (A), the quinoline (B), the benzothiazole (C), the benzimidazole (D) and the benzoselenazole (E). The monomethine cyanine dye is particularly preferred when the two nitrogen-containing heterocyclic rings on ends of the monomethine group are identical to one another to give the dye a symmetrical structure. Specifically, monomethine cyanine dyes of symmetrical structure with both of the two nitrogen-containing heterocyclic rings being one selected from the group consisting of the indolenine (A) and the benzothiazole (C) are more preferred. The monomethine cyanine dyes with symmetrical structure tend to have a smaller refractive index n (real part of the complex refractive index) in the range of 370 to 425 nm as compared to those with asymmetrical structure. This is preferable since significant modulation can be achieved before and after recording. Two or more different monomethine cyanine dyes may be used together for the purposes of adjusting the refractive index n and the extinction coefficient k and enhancing the solubility of the dye.

More specifically, the following monomethine cyanine dyes may be used:

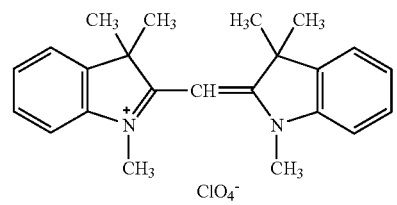

AA-1

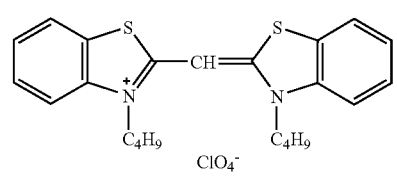

CC-1

-continued

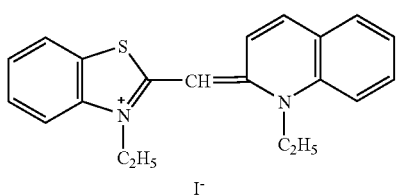

BC-1

These monomethine cyanine dyes may be used either individually or in combination of two or more dyes or may be used in conjunction with a singlet oxygen quencher (which will be described later) so as to obtain desired values for the refractive index n (real part of the complex refractive index) and the extinction coefficient k (imaginary part of the complex refractive index) in the range of 390 to 420 nm.

In the present invention, it is preferred that the recording layer (3) further contain, aside from the monomethine cyanine dyes, a singlet oxygen quencher. It is also preferred that the recording layer (3) contain a singlet oxygen quencher anion in the form of ionically-bonded compound formed with a cation dye.

Preferred examples of the quencher include metal complexes of acetylacetonato quenchers, bisdithiol quenchers, such as bisdithio-alpha-diketone and bisphenyldithiol quenchers, and thiocatechol quenchers, salicylaldehydeoxime quenchers, and thiobisphenolate quenchers. Also preferred are amine compounds containing radical cation of nitrogen and amine quenchers such as sterically hindered amines.

A preferred dye to form the ionically-bonded compound is a cyanine dye having an indolenine ring. A preferred quencher is a metal complex dye such as bisphenyldithiol metal complex.

The quencher and the cyanine dye may be added to the recording layer (3) either individually or in the form of ionically-bonded compound. In either case, the quencher is added preferably in an amount of 1 mole or less, and particularly in an amount of about 0.05 to about 0.8 moles, with respect to 1 mole of the total cyanine dye. In this manner, the light resistance of the recording layer (3) is increased.

Preferably, the recording layer (3) is formed using spin-coat technique. Specifically, a coating solution, which has been prepared by dissolving the aforementioned cyanine dye and, if necessary, the singlet oxygen quencher in a suitable solvent, is spin-coated onto the supporting substrate (2) and is dried, when necessary. The screen-printing technique, the dipping technique, or other suitable coating technique may also be employed.

The organic solvent used in the coating solution for forming the recording layer (3) may be suitably selected depending on the type of the dye used and may be an alcohol, ketone, ester, ether, aromatic solvent, fluorinated alcohol, or a halogenated alkyl. A preferred example of the organic solvent is 2,2,3,3-tetrafluoropropanol.

The recording layer (3) is 30 to 120 nm thick, and preferably 40 to 80 nm thick, in the land area. A proper thickness of the recording layer may be determined by taking into account factors including the desired reflective index, degree of modulation, and the heat interference with the adjacent tracks and recording marks. Among parameters known to affect these factors are geometry of the substrate, behavior of the thermally degrading dye, optical characteristics of the dye, optical characteristics and heat conductivity of the adjacent layers.

Preferably, a dielectric layer (4) is formed over the recording layer (3). The dielectric layer (4) not only serves to provide mechanical and chemical protection for the recording layer (3) but also serves as an interference layer for adjusting optical characteristics of the recording layer (3). The dielectric layer (4) may consist of a single layer or a plurality of layers.

Formed on top of the recording layer (3), the dielectric layer (4) must transmit the recording/reproducing laser light of 390 to 420 nm. Preferably, the dielectric layer (4) has a refractive index $n_4$ (real part of the complex refractive index) of 2 or higher with respect to the wavelength of the recording/reproducing laser light. The refractive index $n_4$ that is higher than 2 is preferred since it allows easy adjustment of the reflective index of the optical recording medium to a desired range (for example, 15 to 20%). While there is no specific upper limit set for the value of $n_4$, materials known to transmit light of 390 to 420 nm generally have a refractive index of approximately 3. It is also preferred that the dielectric layer has an extinction coefficient $k_4$ (imaginary part of the complex refractive index) of 0.2 or lower with respect to the recording/reproducing laser light. The extinction coefficient $k_4$ that is 0.2 or lower is preferred since it leads to a reduced energy absorption by the dielectric layer, allows a wider margin for the adjustment of the reflective index of the medium, and provides an increased sensitivity. Though not limited to a particular value, the lower limit of the extinction coefficient $k_4$ is approximately 0.

The dielectric layer (4) may be made from an oxide, nitride, sulfide, fluoride, or a composite material thereof of at least one metal selected from the group consisting of Si, Zn, Al, Ta, Ti, Co, Zr, Pb, Ag, Zn, Sn, Ca, Ce, V, Cu, Fe, and Mg. It is particularly preferred that the dielectric layer (4) is made from $ZnS-SiO_2$, AlN, or $Ta_2O_3$ in view of the above-described preferred values for the refractive index $n_4$ and the extinction coefficient $k_4$. As for $ZnS-SiO_2$, the $SiO_2$ content is preferably in the range of 10 mol % to 40 mol %. The dielectric layer can be formed using techniques such as the ion-beam sputtering, the reactive sputtering, and the RF sputtering techniques. A proper technique that does not cause damage to the recording layer is selected from these techniques.

While not limited to a particular value, the thickness of the dielectric layer (4) is for example from about 20 to about 150 nm, preferably from 30 to 70 nm. If less than 20 nm thick, the dielectric layer (4) may allow penetration of some components of the light-transmitting layer (5) to the recording layer (3). In contrast, the dielectric layer (4), if more than 150 nm thick, will exhibit too high a heat conductivity, which may result in a reduced sensitivity.

A light-transmitting layer (5) is formed on the dielectric layer (4), or in the absence of the dielectric layer (4), on the recording layer (3).

The material for the light-transmitting layer (5) may be selected from UV-curable resins, electron beam-curable resins, thermosetting resins, or other proper resins, as long as these materials are optically transparent, show low absorbance and low reflectivity for the wavelength range of the laser light used (i.e., 390 to 420 nm), and have a low birefringence. Those materials that are curable by an activation energy ray, including UV-curable resins and electron beam-curable resins, are particularly preferred. These materials are preferably of non-solvent type.

Specifically, the activation energy ray-curable material is made from a UV (or electron beam)-curable compound or a polymerization composition thereof. Examples of such materials include monomers, oligomers, and polymers that, within their molecules, contain or incorporate bonds that form crosslinks, or cause polymerization, upon exposure to UV-light, including acrylic double bonds found in compounds such as ester compounds of acrylic acid and methacrylic acid, epoxy acrylate, and urethane acrylate; allylic double bonds found in compounds such as diallylphthalate; and unsaturated double bonds found in compounds such as maleic acid derivatives. These compounds are preferably polyfunctinal, and particularly trifunctional or higher, and may be used individually or in combination of two or more compounds. The compounds may include those that are monofunctional.

Preferably, the UV-curable monomers are compounds with a molecular weight of less than 2000, and the UV-curable oligomers are compounds with a molecular weight of 2000 to 10000. Examples of these compounds include styrene, ethyl acrylate, ethyleneglycol diacrylate, ethyleneglycol dimethacrylate, diethyleneglycol diacrylate, diethyleneglycol dimethacrylate, 1,6-hexaneglycol diacrylate, and 1,6-hexaneglycol dimethacrylate. Among particularly preferred are pentaerythrytol tetra(meth)acrylate, pentaerythrytol (meth)acrylate, trimethylolpropane tri(meth)acrylate, trimethylolpropane di(meth)acrylate, and (meth)acrylates of phenolethyleneoxide adducts. Other UV-curable oligomers include modified acrylic compounds of oligoester acrylates and urethane elastomers.

The UV (or electron beam)-curable material may contain a known photopolymerization initiator. The photopolymerization initiator is necessary when UV-ray is used as the activation energy ray but not when an electron beam is used. The photopolymerization initiator may be suitably selected from those commonly in use, including acetophenones, benzoins, benzophenones, and thioxanthones. Some of the photopolymerization initiators are known to act as photoradical initiators. Examples include Darocure 1173, Irgacure 651, Irgacure 184, and Irgacure 907 (each manufactured by Ciba Specialty Chemicals Corporation). The photopolymerization initiator is added in an amount of, for example, 0.5 to 5% by weight with respect to the amount of the UV (or electron beam)-curable component.

Compositions containing an epoxy resin and a photo cation polymerization catalyst may also suitably used as the UV-curable material. Such an epoxy resin is preferably an alicyclic epoxy resin, and more preferably, an alicyclic epoxy resin having two or more epoxy groups within its molecule. Preferably, the alicyclic epoxy resin is at least one selected from the group consisting of 3,4-epoxycyclohexylmethyl-3,4-epoxycyclohexane carboxylate, bis-(3,4-epoxycyclohexylmethyl)adipate, bis-(3,4-epoxycyclohexyl)adipate, 2-(3,4-epoxycyclohexyl-5,5-spiro-3,4-epoxy)cyclohexane-methdioxane, bis(2,3-epoxycyclopentyl)ether, and vinylcyclohexene dioxide. While epoxy equivalent of the alicyclic epoxy resin is not limited to a particular value, it is preferably in the range of 60 to 300, and more preferably in the range of 100 to 200 since the alicyclic epoxy resin having epoxy equivalent in this range can ensure a high curability.

The photo cation polymerization catalyst may be any known catalyst used for this purpose. Examples include one or more of complexes of metal fluoroborates and boron trifluoride, bis(perfluoroalkylsulfonyl)methane metal salts, aryl diazonium compounds, aromatic onium salts of elements of group 6A of the periodic table, aromatic onium salts of elements of group 5A of the periodic table, dicarbonyl chelates of elements of group 3A to group 5A of the periodic table, thiopyrilium salts, elements of group 6A with MF6 anion (where M is P, As or Sb), complex salts of triarylsulfonium, complex salts of aromatic iodonium, and complex salts of aromatic sulfonium. Preferably, one or more of complex salts of polyarylsulfonium, aromatic sulfonium salts or iodonium salts of halogen-containing complex ions, and aromatic onium salts of elements of groups 3A, 5A and 6A. The photo cation polymerization catalyst is added in an amount of, for example, 0.5 to 5% by weight with respect to the amount of the UV-curable component.

Preferably, the activation energy ray-curable material used in the light-transmitting layer (5) has a viscosity (25° C.) of 1,000 to 10,000 cp.

The activation energy ray-curable material is spin-coated on the dielectric layer (4) and is subsequently exposed to UV-light or other activation energy light for curing to form the light-transmitting layer (5).

A resin sheet with a desired thickness to serve as the light-transmitting layer (5) may be adhered using an adhesive, provided that the resin and the adhesive are both optically transparent, show low absorbance and low reflectivity for the wavelength range of the laser light used (i.e., 390 to 420 nm), and have a low birefringence.

Examples of the resin for use in the resin sheet include polycarbonate, amorphous polyolefin, and polyester. Prior to adherence, the resin sheet may be subjected to annealing (thermal relaxation) in the temperature range of −20° C. to +80° C. with respect to the heat deformation temperature of the resin. This is to remove the residual stress generated during the production of the sheet. Without annealing, the residual stress of the sheet may cause deformation of the disk during storage. The annealing may be carried out by using various heating means, including a heater, hot plate, hot roller, bake furnace, and electromagnetic induction, which is properly selected for use depending on required conditions for the process.

The adhesive for adhering the sheet may be selected from pressure-sensitive adhesives and UV-curable materials. For example, the activation energy ray-curable material described above as a material for the light-transmitting layer (5) can also serve as a suitable material for the adhesive for adhering the sheet.

When used as the adhesive, the activation energy ray-curable material is spin-coated onto the dielectric layer (4) to deposit an uncured resin material layer. Before the resin cures, the sheet is placed on the resin material layer and is then irradiated with UV-light or other activation energy rays to cure the resin material layer. In this manner, the adhered sheet can serve as the light-transmitting layer (5). More specifically, the sheet is placed on the still uncured resin material layer under vacuum (0.1 atm or less), which is then raised to atmospheric pressure. UV-light is then irradiated onto the sheet to cure the resin material layer.

In general, a correlation exists among the disk skew margin $\theta$ (referred to simply as 'skew margin,' hereinafter), the wavelength $\lambda$ of the recording/reproducing laser light, and the numerical aperture NA of the objective lens: Japanese Patent Laid-Open Publication No. Hei 3-225650 discloses the following relationship that holds between these factors and the skew margin:

$$\theta \propto \lambda/[t \times (NA)^3].$$

In actual mass production of optical disks, if the permissible skew is determined to be 0.4° in view of product yield and production cost, and given that short wavelength laser ($\lambda$=380 nm) is used with an objective lens with a high numerical aperture (NA≧0.76), the light-transmitting layer with a thickness of 170 μm or less is thin enough to ensure a skew margin comparable to that required in DVDs.

On the other hand, the minimum thickness of the light-transmitting layer (5) is preferably 1 μm or larger in order to ensure protection of the dielectric layer (4) and the recording layer (3). However, when the resin sheet is used to serve as the light-transmitting layer (5), the minimum thickness of the light-transmitting layer (5) is preferably kept at 50 μm or larger including the thickness of the adhesive since the resin makes it difficult to form a sheet with uniform thickness. Thus, the preferred range for the thickness t of the light-transmitting layer (5) is from 1 to 150 μm when the layer is formed by coating, and from 50 to 150 μm when the layer is formed by adhering a resin sheet.

EXAMPLES

The present invention will now be described in detail with reference to several examples, which are intended to be only illustrative and not exhaustive.

Example 1

A grooved polycarbonate substrate, 1.1 mm thick and 120 mm in diameter, was used to serve as the supporting substrate (2). Referring to the FIGURE, the groove depth (Gd) was 85 nm, the groove width (Gw) was 160 nm, and the groove pitch (Gp) was 320 nm (=track pitch).

0.08 g cyanine dye, denoted as AA-1, dissolved in 9.92 g 2,2,3,3,-tetrafluoropropanol was spin-coated onto the surface of the supporting substrate (2) to form a layer serving as the recording layer (3) with a thickness of approximately 60 nm in the land area.

Analysis of the absorbance spectrum of the recording layer (3) revealed that the recording layer (3) containing the cyanine dye AA-1 had the minimum refractive index (real part of the complex refractive index) $n_{min}$ of 1.11 at 393 nm and a refractive index n of 1.18 and an extinction coefficient (imaginary part of the complex refractive index) of 0.43 at 405 nm.

Using RF sputtering technique, a layer of ZnS (80 mol %)-$SiO_2$ (20 mol %) to serve as the dielectric layer (4) was formed on the recording layer (3) to a thickness or about 50 nm. The dielectric layer (4) had a refractive index (real part of the complex refractive index) $n_4$ of 2.3 and an extinction coefficient (imaginary part of the complex refractive index) $k_4$ of 0.

A UV-curable resin (viscosity at 25° C.=5000 cp) was then spin-coated onto the dielectric layer (4) and was subsequently irradiated with UV-light to form an about 100 μm thick layer to serve as the light-transmitting layer (5). In this manner, a sample optical disk with a layer construction of the FIGURE was obtained.

Example 2

In Example 2, a sample optical disk was prepared in the same manner as in Example 1, except that in place of the cyanine dye AA-1, a cyanine dye CC-1 was used.

Comparative Examples 1 to 2

In each of Comparative Examples 1 to 2, a sample optical disk was prepared in the same manner as in Example 1, except that in place of the cyanine dye AA-1, a cyanine dye a (Comparative Example 1), or a cyanine dye b (Comparative Example 2), each of which is shown below, was used.

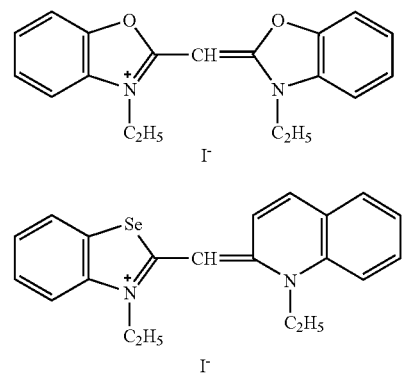

Characteristics of the cyanine dyes used in Examples 1 to 2 and Comparative Examples 1 to 2 are shown in Table 1 below.

TABLE 1

|  | Monomethine cyanine | At 405 nm | | Characteristics in minimum value $n_{min}$ | | |
|---|---|---|---|---|---|---|
|  |  | Refractive index n | Extinction coefficient k | Wavelength $\lambda_{min}$ of minimum value $n_{min}$ (nm) | Refractive index n at $\lambda_{min}$ | Extinction coefficient k at $\lambda_{min}$ |
| Example 1 | AA-1 | 1.18 | 0.43 | 393 | 1.11 | 0.36 |
| Example 2 | CC-1 | 1.20 | 0.81 | 381 | 1.18 | 0.40 |
| Comparative Example 1 | a | 2.16 | 0.24 | 356 | 1.07 | 0.81 |
| Comparative Example 2 | b | 1.63 | 0.19 | 409 | 1.63 | 0.21 |

[Recording/Reproducing Tests]

The sample optical disk prepared in Example 1 was tested for the recording/reproducing performance in the following manner:

The sample optical disk of Example 1 was mounted on an optical disk tester (Product name: DDU-1000, manufactured by Pulstech Industrial Co., Ltd.). Using an objective lens with a NA of 0.85, a recording laser beam having a wavelength in the blue range (405 nm) was focused by a focusing lens placed within a recording head onto the land area of the optical disk to effect recording/reproducing information. The laser beam was shone from the light-transmitting layer side of the optical disk. 1.7 RLL-modulated signal (8T) was used as the recording signal with information recorded only on one track. Multiple pulse train was used for recording: Setting was made in such a manner that, assuming the length of the top pulse of the pulse train to be 1T, the length of the last pulse was 1T and the length of each of multiple pulses between the top and the last pulses was 0.4T (T=clock period). Information was recorded in such a manner that, with a recording power of 10 mW and a minimum pit length of 0.16 µm, the recording line density was 0.12 µm of the channel bit length/ bit. The recorded information was subsequently reproduced with a reproducing power of 0.4 mW and, as a result, good signal characteristics were obtained.

Likewise, the sample optical disks of Example 2 and Comparative Examples 1 to 2 were each tested for the recording/reproducing performance. Good signal characteristics were obtained in the sample optical disk of Example 2, whereas the degree of modulation was small and the C/N ratio was insufficient after recording in the sample optical disks of Comparative Examples 1 and 2.

The above-described examples are only illustrative and are not intended to limit the scope of the invention in any way. Further, any modification in a scope equivalent to the claims is within the scope of the present invention.

What is claimed is:

1. An optical recording medium comprising at least:
   a supporting substrate;
   a recording layer on the supporting substrate, the recording layer comprising at least one organic compound as a major component;
   a dielectric layer on the recording layer; and
   a light-transmitting layer on the dielectric layer, the light-transmitting layer having a thickness of 1 to 150 µm and being capable of transmitting laser light with a wavelength of 390 to 420 nm for recording and reproducing information,
   wherein the at least one organic compound in the recording layer includes at least one monomethine cyanine dye that has the minimum value $n_{min}$ of its refractive index n (real part of the complex refractive index) within the range of 370 to 425 nm and has a refractive index n of 1.2 or lower with respect to the wavelength of the recording/reproducing laser light, and the organic compound, when absorbing the laser light, melts or degrades to bring about a change in the refractive index, thereby effecting recording of the information, and
   wherein the monomethine cyanine dye contains a monomethine group with two nitrogen-containing heterocyclic rings positioned on ends of the monomethine group, said two nitrogen-containing heterocyclic rings being selected from the group consisting of a combination of indolenine and indolenine, a combination of benzothiazole and benzothiazole, and a combination of benzothiazole and quinoline.

2. The optical recording medium according to claim 1, wherein, at the wavelength of the reproducing laser light, the melting or the degradation of the organic compound causes an increase in the refractive index n of the organic compound.

3. The optical recording medium according to claim 1, wherein the organic compound has an extinction coefficient k (imaginary part of the complex refractive index) of 0.15 or above, with respect to both the wavelength of the recording laser light and the wavelength of the reproducing laser light.

4. The optical recording medium according to claim 1, wherein the monomethine cyanine dye contains a monomethine group with two nitrogen-containing heterocyclic rings positioned on ends of the monomethine group, the two nitrogen-containing heterocyclic rings being identical to one another.

5. The optical recording medium according to claim 1, wherein the recording layer further comprises a quencher.

6. An optical recording/reproducing method, comprising:
   providing an optical recording medium comprising at least a supporting substrate; a recording layer on the supporting substrate, the recording layer comprising at least one organic compound as a major component; a dielectric layer on the recording layer; and a light-transmitting layer on the dielectric layer, the light-transmitting layer having a thickness of 1 to 150 µm and being capable of transmitting laser light with a wavelength of 390 to 420 nm for recording and reproducing information, wherein the at least one organic compound in the recording layer includes at least one monomethine cyanine dye that has the minimum value $n_{min}$ of its refractive index n (real part of the complex refractive index) within the range of 370 to 425 nm and has a refractive index n of 1.2 or lower with respect to the wavelength of the recording/reproducing laser light, and the organic compound, when absorbing the laser light, melts or degrades to bring about a change in the refractive index, and wherein the monomethine cyanine dye contains a monomethine group with two nitrogen-containing heterocyclic rings positioned on ends of the monomethine group, said two nitrogen-containing heterocyclic rings being selected from the group consisting of a combination of indolenine and indolenine, a combination of benzothiazole and benzothiazole, and a combination of benzothiazole and quinoline;
   irradiating a recording laser light of 390 to 420 nm onto the optical recording medium from the light-transmitting layer side thereof to effect recording of the information, whereupon the refractive index n of the at least one organic compound with respect to the wavelength of reproducing laser light of 390 to 420 nm is raised in the area irradiated with the recording laser light; and
   subsequent to the recording step, irradiating the reproducing laser light of 390 to 420 nm onto the optical recording medium from the light-transmitting layer side thereof to effect reproducing of the information.

7. The method according to claim 6, wherein the organic compound has an extinction coefficient k (imaginary part of the complex refractive index) of 0.15 or above, with respect to both the wavelength of the recording laser light and the wavelength of the reproducing laser light.

8. The method according to claim 6, wherein the monomethine cyanine dye contains a monomethine group with two nitrogen-containing heterocyclic rings positioned on ends of the monomethine group, the two nitrogen-containing heterocyclic rings being identical to one another.

9. The method according to claim 6, wherein the recording layer further comprises a quencher.

10. The optical recording medium according to claim 1, wherein the at least one organic compound in the recording layer includes at least one of the following monomethine cyanine dyes:

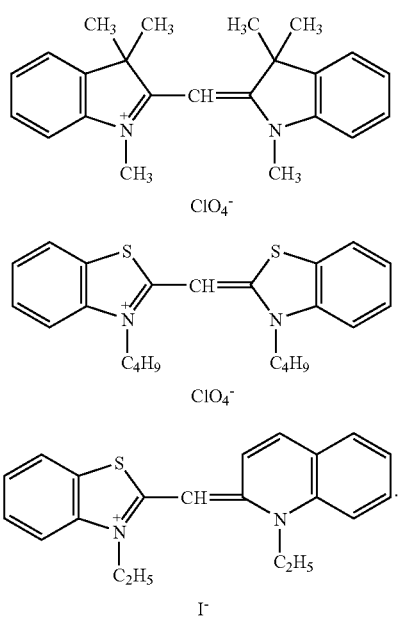
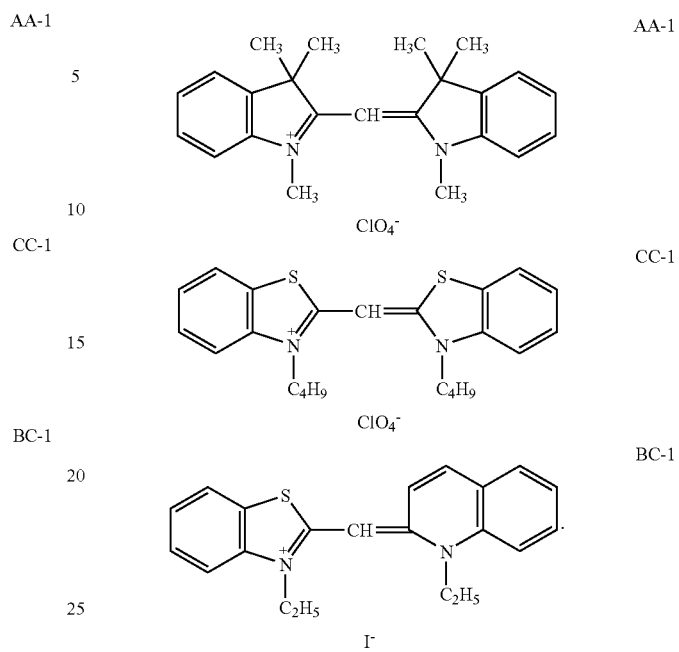
11. The method according to claim 6, wherein the at least one organic compound in the recording layer includes at least one of the following monomethine cyanine dyes:
* * * * *